(12) United States Patent
Hexum

(10) Patent No.: US 9,327,518 B1
(45) Date of Patent: May 3, 2016

(54) GRAPHICALLY PRINTED FURNITURE

(71) Applicant: RC Hexum, LLC, Hayward, WI (US)

(72) Inventor: Ryan Hexum, Hayward, WI (US)

(73) Assignee: R/C Hexum, LLC, Hayward, WI (US)

( * ) Notice: Subject to any disclaimer, the term of this patent is extended or adjusted under 35 U.S.C. 154(b) by 0 days.

(21) Appl. No.: 14/723,207

(22) Filed: May 27, 2015

Related U.S. Application Data

(60) Provisional application No. 62/003,237, filed on May 27, 2014.

(51) Int. Cl.
*B41J 11/00* (2006.01)
*B41J 2/01* (2006.01)
*B41J 3/28* (2006.01)
*G06K 15/02* (2006.01)
*G06K 15/10* (2006.01)

(52) U.S. Cl.
CPC ............... *B41J 11/0015* (2013.01); *B41J 2/01* (2013.01); *B41J 3/28* (2013.01); *G06K 15/021* (2013.01); *G06K 15/102* (2013.01)

(58) Field of Classification Search
CPC ................................ B41J 11/0015; B41J 3/28
USPC ........................................................ 347/104
See application file for complete search history.

(56) References Cited

U.S. PATENT DOCUMENTS

| | | | | |
|---|---|---|---|---|
| 1,968,257 | A * | 7/1934 | Myers | 451/355 |
| 7,001,016 | B2 * | 2/2006 | Baxter et al. | 347/101 |
| 7,470,455 | B2 * | 12/2008 | Spurgeon | 427/553 |
| 8,038,236 | B2 * | 10/2011 | Gauss et al. | 347/4 |
| 2004/0026017 | A1 * | 2/2004 | Taylor et al. | 156/230 |
| 2007/0287365 | A1 * | 12/2007 | Deshpande et al. | 451/357 |
| 2015/0183235 | A1 * | 7/2015 | Garcia Merono et al. | 347/104 |

OTHER PUBLICATIONS

Rules for Sanding Wood, Popular Woodworking Magazine, Bob Flexner, Apr. 8, 2008; http://www.popularwoodworking.com/techniques/rules_for_sanding_wood (accessed Jul. 16, 2015).*
National and International Size Standards, United Abrasives Manufacturers' Association, Cleveland, OH, http://www.uama.org/Abrasives101/101Standards.html. (accessed Jul. 16, 2015).*

* cited by examiner

*Primary Examiner* — Justin Seo
*Assistant Examiner* — Michael Konczal
(74) *Attorney, Agent, or Firm* — Haugen Law Firm PLLP

(57) ABSTRACT

A method for printing a graphical image on a wood furniture work piece includes printing on an unprimed print surface of the wood furniture work piece with an ultraviolet-curable ink printer. The print surface of the wood furniture work piece may be prepared for printing by sanding with an abrasive having a grit rating of no greater than 150. The graphical image may be converted from a digital image data file sourced from, for example, a camera, an optical scanner, or the like. In this manner, durable digital images may be permanently applied to wood furniture work pieces such as tabletops.

6 Claims, 2 Drawing Sheets

GRAPHICALLY PRINTED FURNITURE

CROSS-REFERENCE TO RELATED APPLICATIONS

This application claims priority to U.S. Provisional Patent Application Ser. No. 62/003,237, filed on May 27, 2014 and entitled "GRAPHICALLY PRINTED FURNITURE", the content of which being incorporated herein in its entirety.

FIELD OF THE INVENTION

The present invention relates to graphical treatment of furniture generally, and more particularly to imprinting graphics upon wood surfaces of furniture.

BACKGROUND OF THE INVENTION

Furniture pieces, whether decorative or functional, desirably exhibit unique and attractive aesthetic features, including, for example, carvings, embossments, color patterns, material overlays, and the like. Such aesthetic features add to the uniqueness and value of the furniture pieces.

Furniture pieces with painted designs, high-quality paintings depicting scenes, objects, and the like can be expensive and impractical for large-scale production. Applicant has discovered that the application of a pre-recorded digital image to a furniture work piece can create the desired aesthetic appearance in an economic and scalable process.

SUMMARY OF THE INVENTION

By means of the present invention, digital images may be imprinted as graphics upon wood furniture work pieces. The digital images may be photographs, optical scans, or otherwise digitally generated or captured image data compiled into a digital image file. The digital image file may be processed by computer software in the generation of a print file that may be executed by a printer to apply ink, toner, or other colorant in a predetermined pattern upon the wood furniture work piece to transfer the image to a print surface of the wood furniture work piece.

In one embodiment, a method for printing a graphical image on a wood furniture work piece includes providing a flatbed ultraviolet (UV)-curable ink printer having a printer controller for operating a print head, and a flat printer bed that is sized to accommodate the wood furniture work piece, as well as providing a processor-enabled computer with software means for generating an executable print file from digital image data. The method includes preparing the wood furniture work piece by sanding a print surface of the work piece with an abrasive having a grit rating of no greater than 150, and placing the wood furniture work piece at the printer bed in an orientation for the print surface to receive UV-curable ink from the printer. A digital image data file is provided to the computer, and a software means is directed to generate the executable print file, and to deliver the executable print file to the printer controller to operate the printer controller in accordance with the executable print file. Prior to priming the print surface of the work piece, the printer is operated to print the graphical image on the print surface with UV-curable ink. Subsequent to printing the graphical image, the print surface is sanded.

DETAILED DESCRIPTION OF THE PREFERRED EMBODIMENTS

The objects and advantages enumerated above together with other objects, features, and advances represented by the present invention will now be presented in terms of detailed embodiments which are intended to be representative of various possible embodiments of the invention. Other embodiments and aspects of the invention are recognized as being within the grasp of those having ordinary skill in the art.

Unless otherwise apparent or stated, directional references, such as "upper", "lower", "top", "bottom", "vertical", "horizontal", and the like are intended to be relative to the orientation of an embodiment of the invention as typically employed by a user.

The present invention is directed to printing a graphical image on a wood furniture work piece, and particularly printing the graphical image on a print surface of the work piece before the print surface has been primed. For the purposes of this application, the terms "prime", "primed", "priming", and the like refer to any treatment of or coating to a print surface of the wood furniture work piece, except only cleaning agents such as solvents that are not intended for permanent residence at the print surface, or for absorbing into the wood furniture work piece. Example priming agents or materials include paint, stain, varnish, sealers, gels, and other materials that may be applied as a coating or a penetrant onto or into the surface of a wood work piece. Example cleaning agents, by contrast, include solvents such as acetone that are intended to be only temporarily present at the surface of the work piece, and are typically removed either manually or by evaporation prior to any further treatment of the wood surface. For the purposes hereof, physical manipulations of the wood surface, including sanding, grinding, debriding, and the like are not considered to be "priming" the surface.

Figure 1:
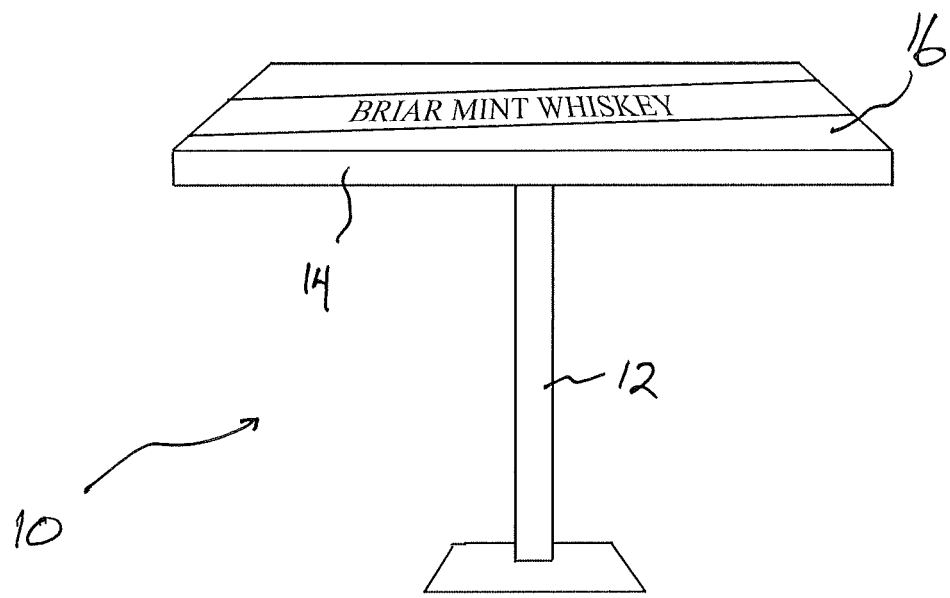
FIG. 1 is a perspective view of a wood furniture work piece of the present invention.
Figure 2:
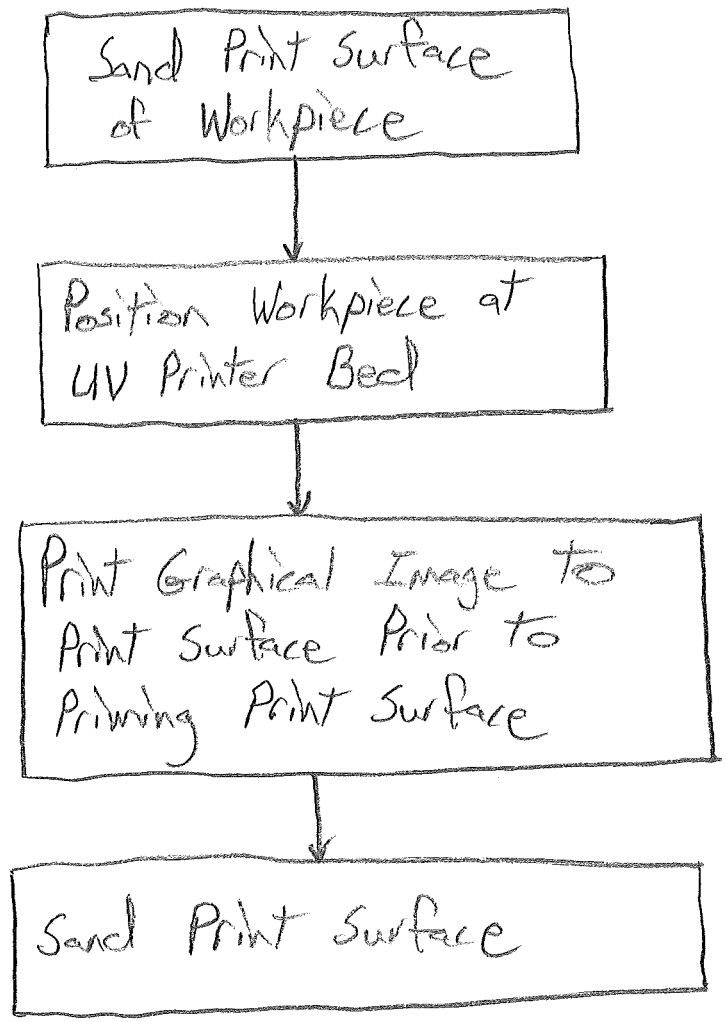
FIG. 2 is a flow diagram of a method for printing a graphical image on a wood furniture work piece of the present invention.

An example wood furniture 10 of the present invention is a table as illustrated in FIG. 1, includes one or more legs 12 and a tabletop 14. For convenience in processing, tabletop 14 may be employed as the work furniture work piece to which one or more legs 12 are secured after printing, though it is contemplated that the entire furniture piece 10 may instead be considered the wood furniture work piece. In typical embodiments of the present invention, tabletop 14 may be used as the wood furniture work piece having a generally planar print surface 16 upon which the graphical image may be printed. It is contemplated, however, that the print surface 16 may be non-planar for certain wood furniture work pieces. The wood furniture work pieces of the present invention typically include wood tabletops, such as for dining tables, end tables, coffee tables, and the like, as well as wood countertops, wood bar tops, wood butcher blocks, wood serving plates, and wood presentation pieces primarily used for displaying or serving food.

The wood furniture work piece may be prepared conventionally, including by ripping rough lumber to desired stave sizes, and then adhering the pieces together to produce the tabletop or other furniture piece. The assembly may then be trimmed and sanded to the desired exact dimensions. The wood furniture work piece is prepared for printing by sanding the print surface 16 with an abrasive. It has been found by the applicant that certain abrasive treatment of the print surface 16 substantially aids in the aesthetics and durability of the printed graphical image. In particular, Applicant has determined that sanding print surface 16 with an abrasive having a grit rating of no greater than 150 results in a print surface that is most receptive to the UV-curable inks employed in the printing process of the present invention. In some embodiments, print surface 16 is sanded with sandpaper as the abrasive in a sequence of progressively finer (larger grit rating) sandpaper of between grit ratings of 80-150. In a particular example, a wide belt sander is used to sand print surface 16 sequentially with first a sand paper having a grit rating of no greater than 80, followed by sanding with a sandpaper having a grit rating of no greater than 120, and further followed by sanding with a sandpaper having a grit rating of no greater than 150. The wide belt sander treatment may then be followed by sanding treatment with an orbital sander using, in order, a sandpaper having a grit rating of no greater than 80, followed by sanding with a sandpaper having a grit rating of no greater than 120, and further followed by sanding with a sandpaper having a grit rating of no greater than 150.

The sanded print surface 16 may then be cleaned with a cleaning agent, such as acetone, by wiping print surface 16 with a cloth moistened with acetone or other cleaning agent.

A printer useful in the printing process of the present invention includes an ultraviolet (UV) ink-curable printer with a flat printer bed that is sized to accommodate the wood furniture work piece, and a printer controller for operating a print head. An example UV printer useful in the present invention is available from Canon, Inc. under the brand name OCE Arizona UV Flatbed Printers having a 98 inch by 49 inch by 2 inch flat printer bed, including a vacuum hold-down feature. The UV printer is driven by a printer controller that is communicatively coupled to appropriate software that is configured for generating print files that are executable by the printer controller. Operation of the software is performed by a processor-enabled computer that is communicatively linked to the printer controller.

The prepared wood furniture work piece is placed at the printer bed in an orientation for the print surface to receive UV-curable ink from the printer. Once the wood furniture work piece is appropriately positioned at the printer bed, the printer controller is operated to initiate print head operation to apply the UV-curable ink to the print surface 16 of the work piece in accordance with the executable print file delivered to the printer controller from the computer. Such executable print file is generated by the software from a digital image data file inputted to the computer by a user either directly, or through an external device, such as a camera, scanner, external hard drive, or the like. Image data files in .jpg, .jpeg, .pdf, .tiff, and other image data file types are expected to be processable by the software.

As indicated above, an aspect of the present invention is printing the graphical image to the print surface 16 with UV-curable ink prior to priming print surface 16 of the work piece. It has been found by the Applicant that such a processing order significantly benefits the aesthetics and durability of the printed graphical image. Conventional image printing processes, by contrast, require priming the print surface of the work piece with a base colorant or other coat layer prior to allegedly provide a "consistent" color background.

Subsequent to the graphical image printing and curing, the wood furniture work piece is removed from the print bed, and the print surface sanded to obtain the desired aesthetic appearance of the printed image. Preferably, this sanding step is performed with an abrasive, such as sandpaper, with a grit rating of at least 180.

Subsequent to the finishing sanding step, a range of techniques may be used to add additional customization to the appearance of the print surface of the wood furniture work piece. In some embodiments, a stain, varnish, and/or paint may be applied to the printed and sanded print surface 16. In some embodiments, a stain may be applied by cloth to the printed and sanded print surface 16, and allowed to dry for 30-120 minutes. A varnish seal coat available from ML Campbell as a conversion varnish may be applied with a spray gun to the stained surface, and allowed to dry for 30-120 minutes. The first seal coat layer over the stain may be sanded with a sandpaper abrasive having a grit rating of at least 220. Second and additional seal coats of conversion varnish may be applied with the spray gun, with each coat application being allowed to dry for 30-120 minutes, followed by sanding with a sandpaper abrasive having a grit rating of at least 220. The one or more layers of conversion varnish comprise a top coat that may protect the printed graphical image and print surface 16 from damage, and may further enhance the aesthetic appearance of the finished work piece.

The invention has been described herein in considerable detail in order to comply with the patent statutes, and to provide those skilled in the art with the information needed to apply the novel principles and to prepare and use embodiments of the invention as required. However, it is to be understood that various modifications can be accomplished without departing from the scope of the invention itself.

What is claimed is:

1. A method for printing a graphical image on a wood furniture work piece, said method comprising:
    (a) providing a flatbed ultraviolet (UV)-curable ink printer having a printer controller for operating a print head, and a flat printer bed sized to accommodate said wood furniture work piece;
    (b) providing a processor-enabled computer with software means for generating an executable print file from digital image data;
    (c) preparing said wood furniture work piece by sanding a print surface of said work piece with a first abrasive having a grit rating of no greater than 150;
    (d) placing said wood furniture work piece at said printer bed in an orientation for said print surface to receive UV-curable ink from said printer;
    (e) providing a digital image data file to said computer;
    (f) directing said software means to generate said executable print file from said digital image data file, and to deliver said executable print file to said printer controller to operate said printer controller in accordance with the executable print file;
    (g) absent priming said print surface of said work piece, operating said printer to print said graphical image on said print surface with UV-curable ink; and
    (h) subsequent to printing said graphical image, absent applying a stain, varnish, or paint to said printed print surface, sanding said print surface with a second abrasive having a grit rating of at least 180.

2. A method as in claim 1, including, subsequent to sanding said printed print surface, applying a stain, varnish, and/or paint to said printed print surface.

3. A method as in claim 2, including sanding said print surface subsequent to said stain, varnish, and/or paint application with an abrasive having a grit rating of at least 220.

4. A method as in claim 1 wherein said abrasive is sandpaper.

5. A method as in claim 4, including preparing said print surface prior to printing said graphical image by:
    (a) sanding said print surface with a wide belt sander using, in order:
        (i) sandpaper having a grit rating of no greater than 80;
        (ii) sandpaper having a grit rating of no greater than 120;

(iii) sandpaper having a grit rating of no greater than 150; and (b) subsequent to step (a), sanding said print surface with an orbital sander using, in order:

(i) sandpaper having a grit rating of no greater than 80 (ii) sandpaper having a grit rating of no greater than 120;

(iii) sandpaper having a grit rating of no greater than 150.

6. A method as in claim 1 wherein said wood furniture work piece is a tabletop.

\* \* \* \* \*